Sept. 4, 1934.   E. G. STAUDE   1,972,694
TRACTOR ATTACHMENT FOR AUTOMOBILES
Filed Aug. 24, 1929   4 Sheets-Sheet 1

INVENTOR
EDWIN G. STAUDE
BY
ATTORNEYS

Sept. 4, 1934. E. G. STAUDE 1,972,694
TRACTOR ATTACHMENT FOR AUTOMOBILES
Filed Aug. 24, 1929 4 Sheets-Sheet 2

INVENTOR
EDWIN G. STAUDE
ATTORNEYS

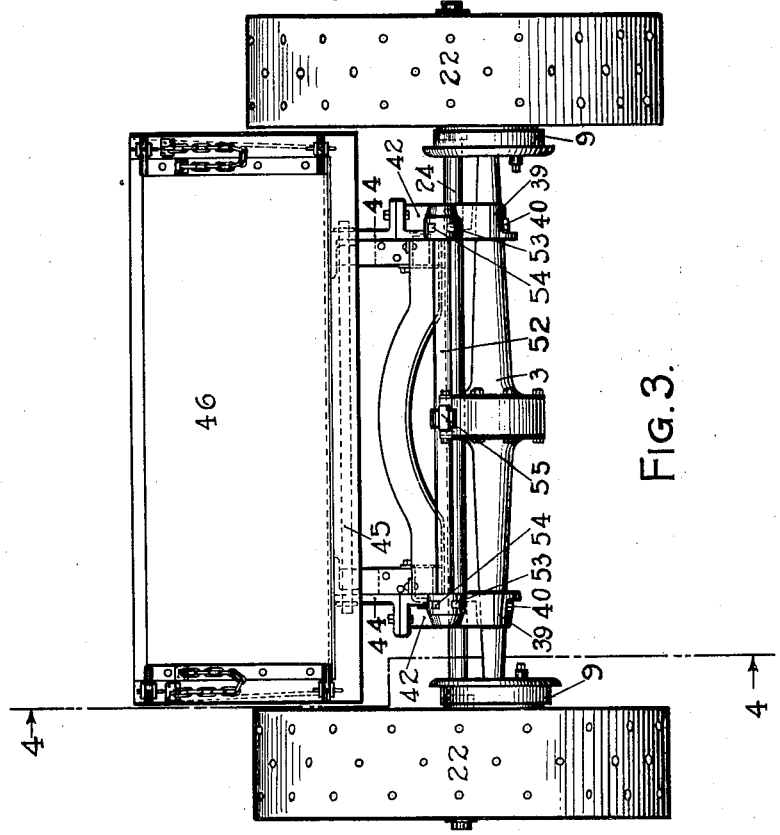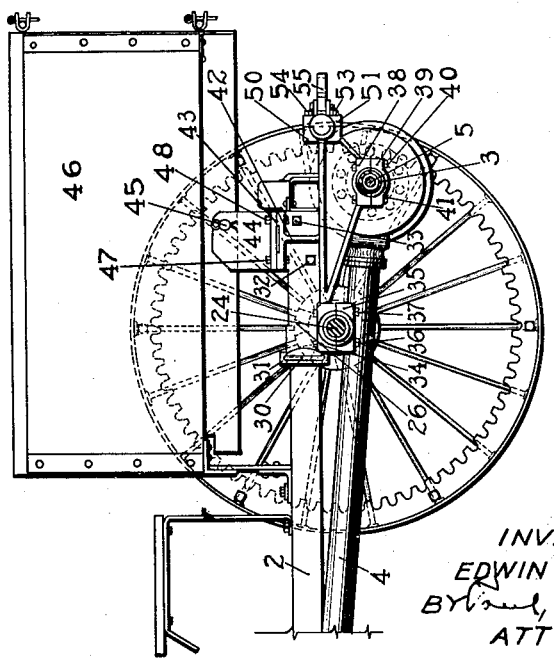

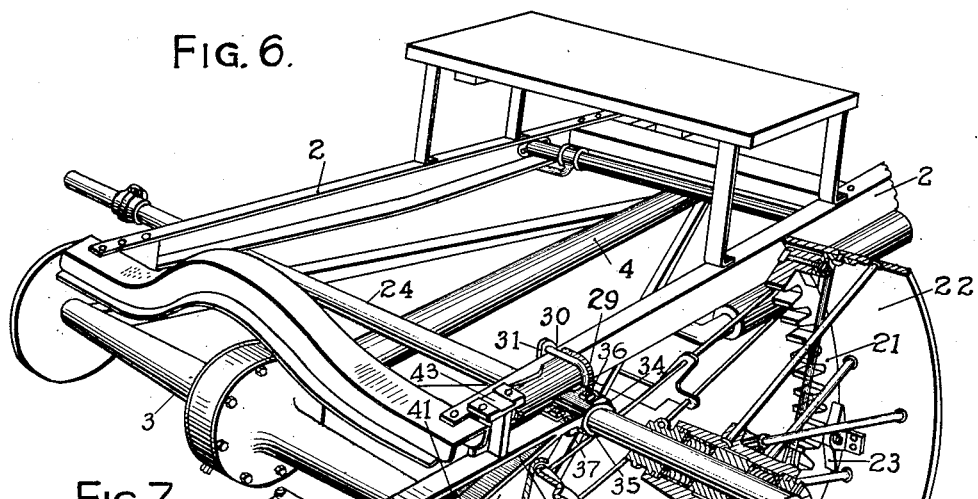
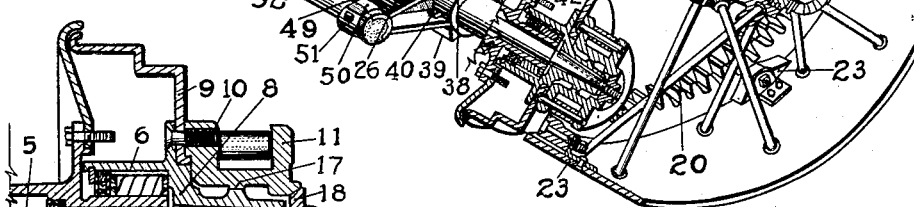
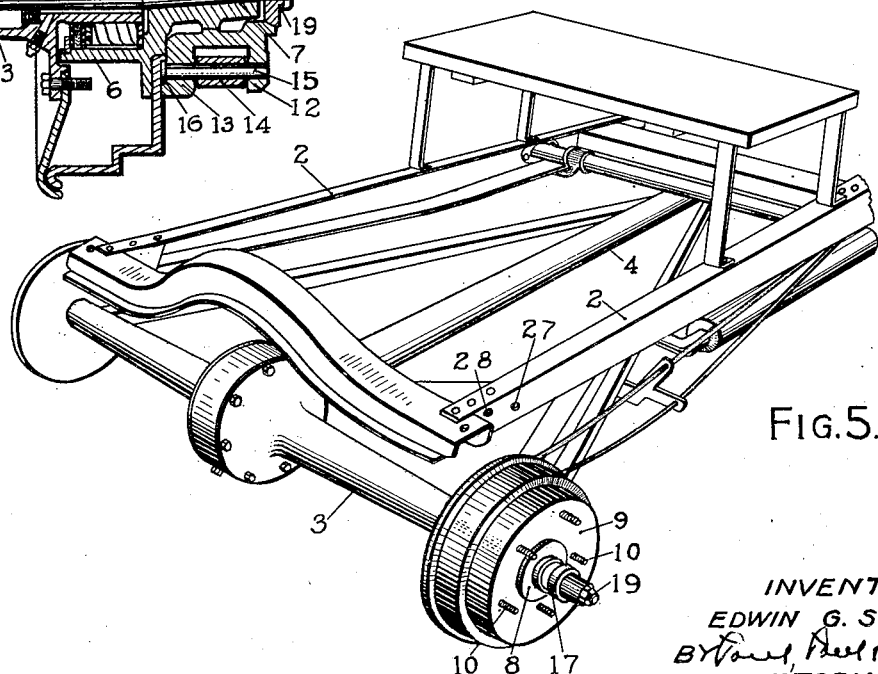

Patented Sept. 4, 1934

1,972,694

UNITED STATES PATENT OFFICE 1,972,694

TRACTOR ATTACHMENT FOR AUTOMOBILES

Edwin G. Staude, Minneapolis, Minn.

Application August 24, 1929, Serial No. 388,199

4 Claims. (Cl. 180—16)

This invention relates to means for quickly converting automobiles into tractors at small cost. It is a well known fact that great savings of cost are made by utilizing parts that are in mass production, and one of the purposes of this invention is to utilize the power plant, main frame, running gear, steering mechanism, rear differential and propeller shaft connection of the present model "A" Ford chassis and to provide an attachment which can be secured to this, without drilling a single new hole in the existing Ford parts, the said attachment including a heavy tractor axle, tractor wheels, and driving means for driving the tractor wheels from the automobile propeller shaft.

It is, therefore, an object of this invention to provide a very economical means for converting an automobile into a light weight tractor, and it is a further object to accomplish the conversion without destroying the design symmetry of the existing vehicle.

In order to drive the tractor wheels, each rear Ford wheel, which is held in place by five bolts, is removed, and these bolts are utilized as dowel pins to cooperate with openings of specially designed pinions which are fitted over the Ford axle in place of the rear wheels. Instead of securing the pinions on the bolts above mentioned by means of nuts in the manner that the rear wheels were originally held, a single nut is utilized for securing the tractor pinion against the brake drum, and in such cooperative relation to the original five bolts as to cause rotation of the pinion with the brake drum, which brake drum as clearly shown is adapted to be driven by the rear axle.

An advantage is that the tractor pinion is easily and quickly applied to the Ford axle without the need of any alteration on the Ford unit.

Among the objects of this invention are: to provide a unit which may be easily and quickly attached by using existing holes in chassis and without drilling a single hole; to provide a unit which shall be inexpensive to manufacture but shall embody the highest engineering principles known in tractor practice; to provide simple means for securing the pinion to the Ford axle in place of the Ford rear wheel; and to provide a simplified and practical connection for supporting the dump body.

Objects, features and advantages of the invention will appear from the following detail description of the drawings, and in said drawings:

Figure 3 is a rear elevation of Figures 1 and 2, with the addition of a dump body;

Figure 4 is a sectional side view of Figure 3, on the line 4—4, looking in the direction of the arrow, showing only the rear portion of the tractor;

Figure 5 shows a perspective of a model "A" Ford chassis stripped of the rear spring and rear hydraulic shock absorbers ready for my invention to be applied thereto;

Figure 6 is a view similar to Figure 5, showing my invention applied to the right hand side, with the tractor wheel and pinion in section; and Figure 7 is a detail section showing the pinion connection with the Ford axle.

Figure 1:
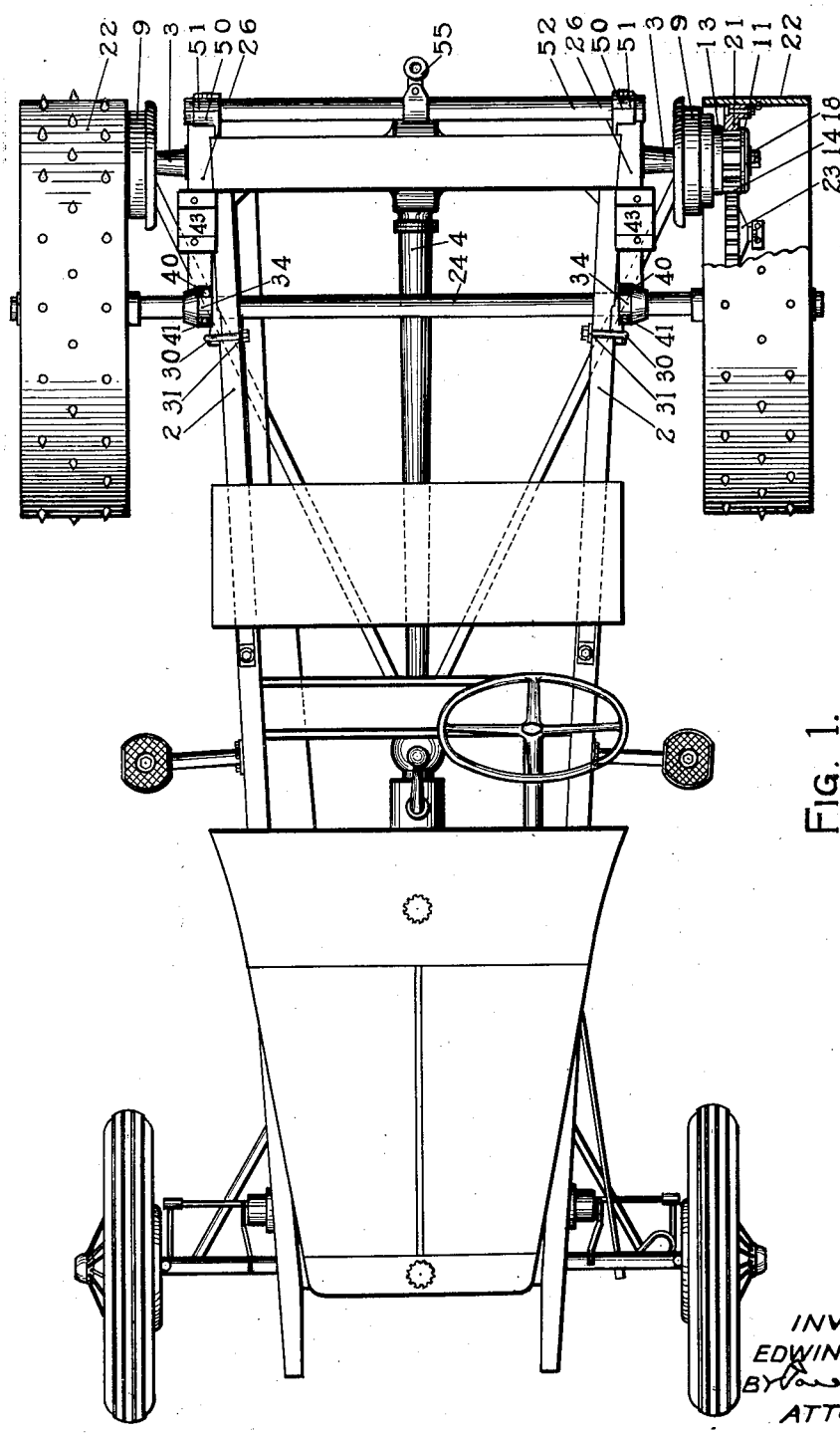
Figure 1 is a plan view partly in section of the vehicle showing my improved tractor appliance attached thereto.
Figure 2:
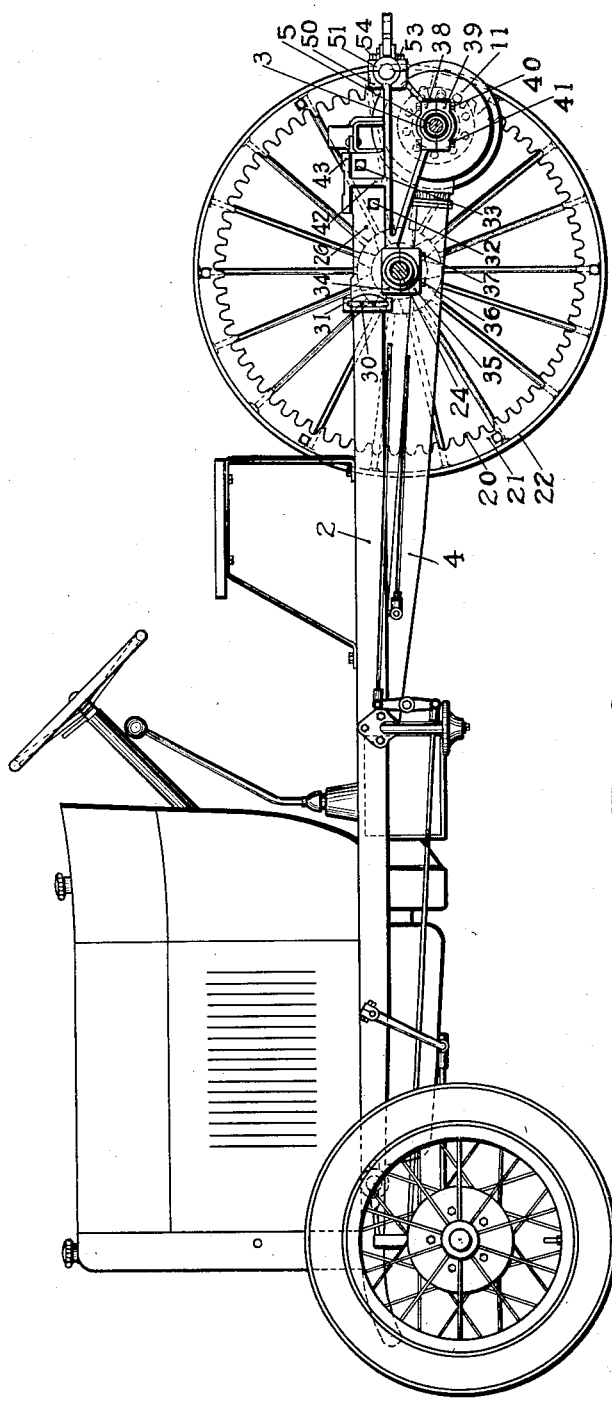
Figure 2 is a side elevation of Figure 1, with the tractor wheel removed to show the tractor and rear axle supporting bracket.

In the drawings, 2 represents the rear part of a Ford chassis frame, and 3 represents the rear axle housing driven by the usual propeller shaft 4.

The rear axle housing 3 contains the usual live axle 5, see Figure 7, the ends of which are supported in suitable bearings. The axle 5 is provided with the usual tapered end 7 having the usual splined connection with a member 8 supported on roller bearings 6, and to which is connected the usual brake drum 9.

Suitable studs 10 are riveted in the member 8 and brake drum 9, and extend beyond the brake drum a sufficient distance to permit the securing of the usual demountable wheel, which ordinarily fits an extension of the member 8. In Figure 7, I have shown the usual wheel removed, and in its place is secured the ten tooth pinion structure comprising an annulus 11 having flanges 12 and 13 spaced to form a circumferential groove crosswise of which and between the flanges, rollers 14 are mounted on the pins 15. These rollers 14 constitute the pinion teeth. Each pin 15 has a head 16. The flange 13 has openings receiving the ends of the studs 10 which act as dowel pins securing the annulus 11 for rotation with the brake drum. The pinion structure is also referred to as the pinion.

The annulus 11 is centered at 17 on the member 8 and forced against the brake drum 9 by a tapered nut 18, on a threaded portion 19 of the tapered axle portion 7.

Means has thus been devised which differs from that utilized for holding the rear Ford wheel, because the centers of the ten rollers in the annulus (which mesh with suitable teeth in the bull gear secured inside the tractor wheel tire) are spaced so that a wheel bolt comes between every second roller, which would not be the case where the number of rollers are not divisible by five. There is, however, an advantage in that a flange projection 13 can be provided on the annulus, and bores are provided in this flange to receive the roller studs 15, and the flat sides of the heads 16 of these studs engage the face of the drum, and are prevented from moving in an axial direction when the annulus is bolted against the Ford brake drum. These studs are, therefore, held securely in position and cannot work out, or cannot be removed without removing the annuli, yet the studs and rollers can be quickly removed and replaced by others. This is an advantage for replacing worn rollers and studs. It, of course, follows that the openings in the tractor annulus, into which the bolt heads 10 fit, come between the rollers that are in the annulus. It so happens that the proper number of rollers in the pinion structure for tractor purposes is an even number divisible by five, which is the number of bolts used to secure the Ford rear wheel.

From the description above given it is clear that the rear wheel has simply been removed, and that the demountable nuts before used for holding this wheel are dispensed with. These nuts cannot be used because the radius distance of the ten tooth pinion structure comes substantially over the holes required to receive the studs 10, and therefore must come between the rollers, but in thus coming between the rollers there is not enough room to engage a nut with the stud without separating the wheel base of the tractor by an impractical distance and therefore the annulus is held in position by the centering effect of the tapered nut 18. The rollers 14 in turn mesh with the teeth 20 of the bull gear 21, which is secured to the traction wheel 22 by suitable angle clamps 23 secured to the tractor wheel tread. The size of the bull gear is such that it will give the correct speed with a ten tooth pinion structure.

In order to provide a bearing for the tractor wheels 22, an axle shaft 24 is located directly underneath the chassis 2 forwardly of the rear axle housing 3. The rear spring is, of course, not used and in order not to lengthen the wheel base the tractor axle is carried underneath the frame forwardly of the differential, and suitable bracket members 26 are provided, and are attached by bolts which are adapted to register with the same openings by which the Ford shock absorbers (now removed) were originally secured. The construction and functions of these brackets are important features of this invention. Each bracket is additionally secured to the frame by a special bolt clamp all to be described. A bracket is secured adjacent each corner at the rear of the Ford chassis frame, and the brackets are made in rights and lefts and each has a portion projecting rearwardly beyond the chassis to provide extensions to which a drawbar is secured. The same bracket members which hold the tractor axle to the Ford chassis frame also provide bearings for properly rigidly supporting the Ford rear axle casing which has now become a jack-shaft.

In order to hold the axle shaft 24 in rigid relation with reference to the drive pinion, the brackets 26 are attached, and each is so designed as to utilize the ready-bored bolt holes 27—28 in the Ford chassis (which holes are ordinarily used for securing the hydraulic shock absorbers which are part of the regular equipment. The bracket as a casting, extends forwardly as at 29 and around this extended portion are applied a U-shaped bolt 30 and plate 31, arranged to clamp the member 26 securely to the Ford chassis. Bolts 32—33 pass through the holes 27—28 of the chassis, and the member 26 is thus rigidly secured without drilling a single additional hole, and the design gives the appearance that the casting 26 is a part of the original equipment.

In order to hold the axle 24 in the casting 26 a suitable journal box 34 is provided having a cap 35 on the upper side secured by two bolts 36—37. In order to hold the rear axle housing 3 in rigid position in reference to the axle 24, a journal box 38 is provided which box has a cap 39 held in position by bolts 40—41. The connection for holding the Ford rear axle in rigid position has a tapered box with a corresponding cap to fit the taper of the Ford housing. When the caps of these boxes are securely bolted down the housing is rigidly secured also against movement in an axial direction.

Means is also provided, see Figures 3, 4 and 6, for bolting a suitable dump body to the bracket 26, and for this purpose each bracket is provided with an extension 42 having a flat horizontal surface 43 adapted to receive an angle plate 44. A pivot rod 45 pivots the dump body 46. The angle plate 44, is bolted to the flat surface of member 43 by bolts 47—48. This is an important feature because it is frequently desirable to use a dump body for hauling sand, gravel and other material with this type of machine. The brackets 26 therefore perform a plurality of functions, valuable in combination as well as severally.

Since there is no provision for a drawbar on the Ford housing, each bracket 26 has an extension rearwardly of the housing, and each is provided with a suitable journal box and cap adapted to receive a clamp at drawbar 52. Fitted over the drawbar is a suitable drawbar eye which can be adjusted for the entire length of the drawbar and therefore throughout the transverse extent of the chassis. The drawbar construction is as follows: A projection 49 is provided on the member 26 and has a box 50 and a cap 51 for clamping the drawbar member 52 securely into position by suitable bolts 53 and 54. The suitable drawbar eye 55 is slidably clamped over the drawbar 52 and therefore adjustable over the entire length of the said drawbar.

It will, therefore, be seen that means is herein provided for quickly and cheaply converting an automobile into a tractor. The brackets 26 provide means for supporting the rear axle housing after the spring has been removed, for supporting the traction wheel axle 24, for pivotally attaching a dump body, and for attaching a drawbar. Moreover, the invention provides a very simple means for attaching a traction wheel driving pinion to the driving axle in lieu of the wheel, by simply removing the wheel and utilizing certain of the connections, which non-rotatably secure the wheel to the drum, for causing the pinion to rotate with the drum in lieu of the wheel.

While this attachment and its connection with a model A Ford chassis is claimed, the use of the attachment as a conversion unit with any make of automobile is also claimed. Those details which relate to the connection of the bracket 26 utilizing the openings 27 and 28 is also claimed, but it is conceivable that this connection may be made in other ways, all within the purview of this invention.

I claim as my invention:

1. In combination with an automobile having a frame, a rear axle, brake drums driven from the axle, said drums having studs for non-rotatably connecting rear wheels thereto, brackets secured to the frame, a shaft supported by the brackets, tractor wheels on the shaft each having a gear, and pinions on the rear axle, and secured thereto against axial motion by a single nut and meshing with said tractor wheel gears, said pinions being held for rotation with the drum by means of said studs.

2. In combination with an automobile having a frame, a rear axle, brake drums driven from the axle, said drums having studs for non-rotatably connecting rear wheels thereto, brackets secured to the frame, a shaft supported by the brackets, tractor wheels on the shaft each having a gear, and pinions on said rear axle, and meshing with the tractor wheel gears, said pinions being held for rotation with the drum by means of said studs.

3. In combination with a rear axle of an automobile, a brake drum rotatable by the axle, a pinion structure including an annulus rotatable with and supported on the drum and having journals and rollers rotatable thereon and forming the pinion teeth, said journals having heads engaging the drum and annulus in a manner to prevent axial motion and means securing the annulus against axial motion.

4. In combination with an automobile including a chassis, rear axle housing and rear axle, brackets rigidly secured to the side rails of the chassis, and supporting said housing, a shaft supported by the brackets, said brackets having bearings releasably supporting said housing and shaft, the bearings being arranged on the lower side of the brackets, tractor wheels on said shaft, pinions driven by the rear axle, and gears carried by the tractor wheels and meshing with said pinions, said brackets having means by which a dump body can be secured thereto, and having means at the rear for releasably securing a draft bar.

EDWIN G. STAUDE.